United States Patent [19]

Knudsen et al.

[11] Patent Number: 4,679,445
[45] Date of Patent: Jul. 14, 1987

[54] ON-LINE REPLACEMENT SENSOR ASSEMBLY FOR A VORTEX SHEDDING FLOWMETER

[75] Inventors: James K. Knudsen, East Greenwich, R.I.; Jane E. Smith, Mentor, Ohio; Victor J. Budan, Eastlake, Ohio; David J. Wroblewski, Willoughby, Ohio; Eugene Skuratovsky, Mayfield Hts, Ohio

[73] Assignee: The Babcock & Wilcox Company, New Orleans, La.

[21] Appl. No.: 825,413

[22] Filed: Feb. 3, 1986

[51] Int. Cl.⁴ .............................................. G01F 1/32
[52] U.S. Cl. .................................................. 73/861.24
[58] Field of Search ............ 73/861.22, 861.24, 861.75

[56] References Cited

U.S. PATENT DOCUMENTS

| | | | |
|---|---|---|---|
| 1,935,445 | 11/1933 | Heinz | 73/861.24 |
| 4,033,189 | 7/1977 | Herzl | 73/861.24 |
| 4,291,583 | 9/1981 | Buike | 73/861.25 |
| 4,552,026 | 11/1985 | Knudsen et al. | 73/861.24 |

FOREIGN PATENT DOCUMENTS

| | | | |
|---|---|---|---|
| 0160813 | 9/1983 | Japan | 73/861.24 |
| 2131171 | 6/1984 | United Kingdom | 73/861.24 |

Primary Examiner—Herbert Goldstein
Attorney, Agent, or Firm—Vytas R. Matas; Robert J. Edwards

[57] ABSTRACT

A sensor arrangement for a vortex shedding flowmeter having a flowmeter housing which is exposed to a flowing fluid in a fluid space on one side of the housing, comprises a sensor housing which is connected to the flowmeter housing and which defines an internal sensor space. A sensor beam is connected to the housing and has a first portion extending into the sensor space with a second portion extending through the flowmeter housing into the fluid space. A diaphragm resiliently carries the beam for movement in response to the passage of vortices in the fluid space. A mounting bracket is detachably connected to the sensor housing and carries a sensor element. The sensor element is operatively connected to the first portion of the sensor beam and can be easily engaged and disengaged thereto when the mounting bracket is to be removed. In this way if the sensor element fails, it can be replaced without stopping the flow of fluid or disturbing the sensor beam.

10 Claims, 2 Drawing Figures

ON-LINE REPLACEMENT SENSOR ASSEMBLY FOR A VORTEX SHEDDING FLOWMETER

FIELD AND BACKGROUND OF THE INVENTION

The present invention relates in general to fluid flowmeters and in particular to a new and useful vortex shedding flowmeter having an easily replaceable sensor assembly.

When a non-streamlined body is placed in a stream of moving fluid, layers of slow moving fluid are formed along the outer surface of the body and are shed in the form of repeating vortices. In a uniform flow of fluid, the frequency of these vortices is related in a linear way to the fluid velocity.

Flowmeters which take advantage of the vortex shedding phenomenon are known, for example from U.S. Pat. No. 4,171,643 to Frick. This reference shows the use of a strain gage for sensing the passage of vortices. The strain gage is mounted on a sensor assembly which can be replaced.

U.S. Pat. No. 4,519,259 to Pitt et al discloses a vortex shedding flowmeter which utilizes a light barrier to sense the passage of a vortex.

Various vortex shedding flowmeters are commercially available from companies such as Yokogawa, Foxboro, and Fisher & Porter. None of these available products, however, have in-line replaceable sensors in that the sensors of these products cannot be replaced without interrupting or diverting to a bypass pipeline the flow being measured. Most manufacturers utilize some type of electric sensors such as a piezoelectric sensor or stain gage. These sensors are permanently installed in the sensing device, usually by welding. Because of this the entire device must be replaced if failure occurs in the sensor, during manufacturing or operation.

Failure of the sensing element during operation requires a shutdown in the process being measured or a bypass line and valves must be in place if interruption of the process is undesirable. In both cases large costs are incurred. This is required since it is necessary to disturb the pressure boundary in the process in order to replace the sensing element.

SUMMARY OF THE INVENTION

An object of the present invention is to provide an arrangement for a vortex shedding flowmeter which eliminates a permanent attachment of the sensing element to a portion of a pressure boundary of the sensing device, so that the sensing element can be replaced and maintained easily without process interruption.

While the present invention is primarily suited for a vortex shedding flowmeter which utilizes a fiber optic microbend sensor to sense the passage of vortices, it is also applicable where other types of sensing elements are utilized.

Advantages of the invention include the fact that a process being measured need not be shut down for sensor replacement. Further, down-time due to failure of the sensor is minimized because of the extreme simplicity and limited number of operations required to replace the sensor.

The number of parts which must be scrapped is also minimized. Generally in the case of a fiber opic microbend sensor, only the fiber optic cable itself and its connectors need be replaced.

For the preferred embodiment of the invention disclosed in detail below, it was found that a sensor assembly could be completely replaced in less than five minutes.

Accordingly a further object of the present invention is to provide a sensor arrangement for a vortex shedding flowmeter having a flowmeter housing which is exposed to a flowing fluid in a fluid space on one side of the flowmeter housing, comprising a sensor housing defining a sensor space, a sensor beam connected to said sensor housing and having a first portion extending into said sensor space and a second portion extending through the flowmeter housing into the fluid space, pressure boundary means connected to said beam for isolating the sensor space from the fluid space, a mounting bracket detachably connected to the sensor housing and extending into the sensor space, and a sensor element operatively connected to said mounting bracket and disposed in said sensor space, said sensor element being engaged with the first portion of said beam for sensing movement thereof when the second portion of the beam is exposed to vortices in the fluid space, whereby the sensor element can be removed without removal of the sensor beam or the pressure boundary means for replacement thereof.

A further object of the invention is to provide a sensor arrangement for a vortex shedding flowmeter which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

DESCRIPTION OF THE PREFERRED EMBODIMENT

Figure 1:
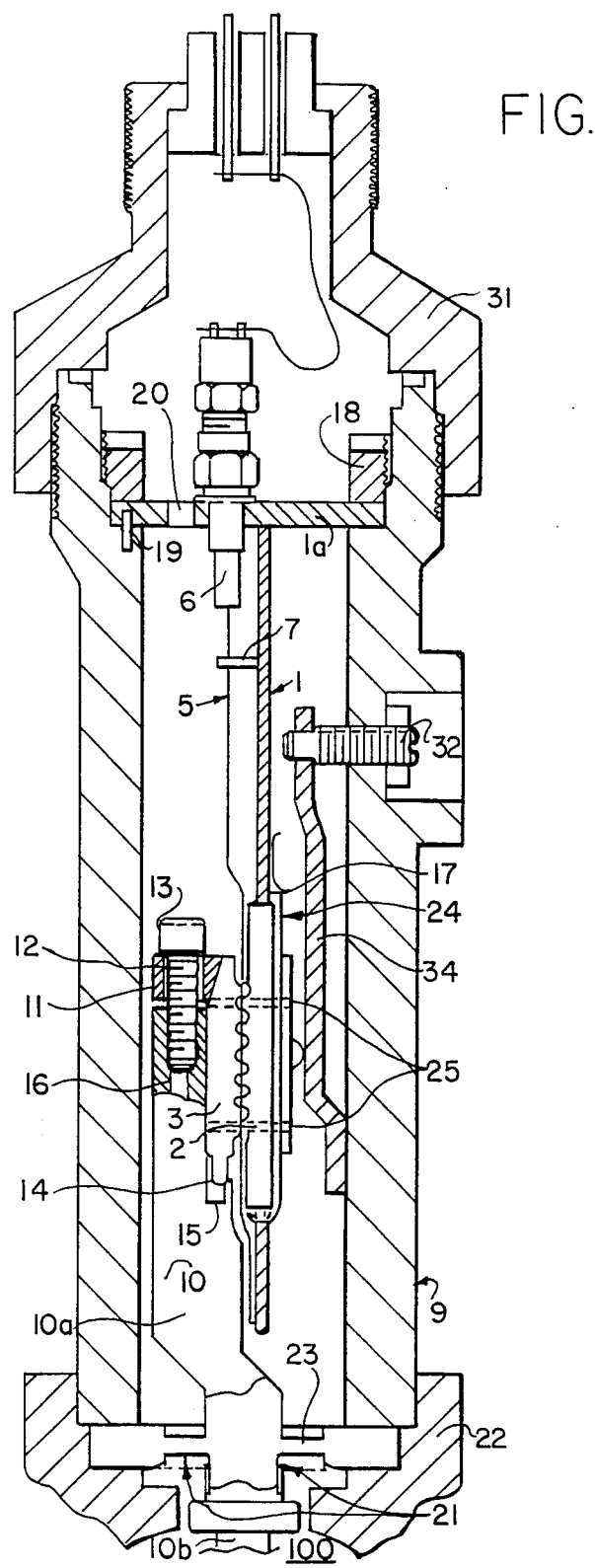
FIG. 1 is a sectional view of a sensor arrangement in accordance with the invention, taken in a transverse direction with respect to a fluid flow to be measured by a vortex shedding flowmeter utilizing the sensor arrangement.
Figure 2:
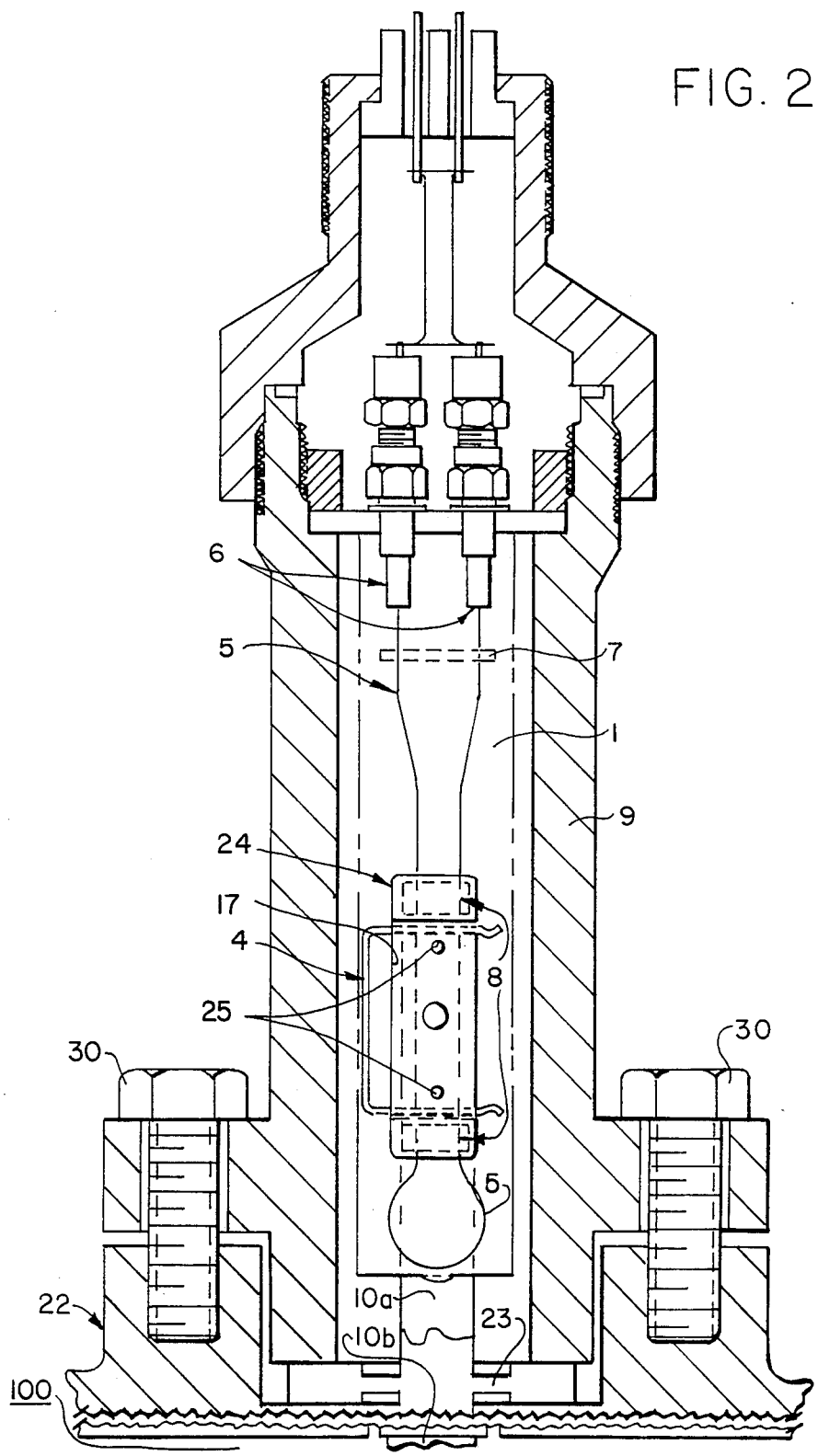
FIG. 2 is a sectional view of the sensor arrangement shown in FIG. 1, taken longitudinally to the flow direction.

Referring to the drawing in particular, the invention embodied therein comprises a sensor arrangement for a vortex shedding flowmeter which has a flowmeter housing 22. The flowmeter housing 22 is exposed to a flowing fluid in a fluid space 100 which is below the housing 22 in the Figures. A sensor housing 9 which is substantially cylindrical in shape, is connected to the flowmeter housing 22 by bolts 30. Sensor housing 9 defines an inner sensor space.

A sensor beam 10 has a first upper portion 10a which extends upwardly into the sensor space, and a lower second portion 10b which extends the flowmeter housing 22 into the fluid flow space 100. Pressure boundary means 23, for example in the form of a flexible diaphragm which is connected between housings 9 and 22, isolate the sensor space in housing 9 from the fluid space 100 on the opposite side of housing 22. Diaphragm 23 thus forms a pressure boundary 21 which, in accordance with the invention, is not disturbed even when a sensing element in housing 9 is replaced.

A sensor assembly generally designated 24 is detachably mounted in the sensor space of sensor housing 9. It comprises a mounting bracket 1 which has an upper flange portion 1a that can be detachably fixed to housing 9. Housing 9 includes an upper step which has a downwardly extending blind bore into which pin 19 extends. Pin 19 is connected to flange portion 1a and is used to establish a correct rotational position of the bracket 1 in the housing 9. Flange portion 1a is detachably fixed to the housing by a lock nut 18 which is threaded into the upper end of housing 9. A cover 31 is threaded over the upper end of housing 9 to cover the sensor space.

Mounting bracket 1 forms a frame or fixture for holding the sensor assembly 24. Sensor assembly 24 comprises a first microbend jaw 2 and is attached to the mounting bracket 1 by means of a spring 4. A second microbend jaw 3 is held to jaw 2 with a fiber optic cable or fiber 5 being located between the two jaws. The fiber optic cable terminates in connectors 6 which are attached to the flange portion 1a of the mounting bracket 1. Connectors 6 are used for coupling a light signal to circuitry (not shown) for analyzing light passing through the optical cable 5. The cable 5 is supported and positioned by supporting tab 7 connected to the mounting bracket 1. This tab is located between the bottom of the connector 6 and the top of the microbend jaws 2,3. The optical fiber or cable 5 is also held and positioned correctly in the microbend jaw 2 by means of clamps 8. All of these components comprise an integral and independent subassembly unit which is placed in the sensor housing 9. Microbend jaws 2,3 are aligned to each other by means of slip pins 25.

Microbend jaw 3 has a mounting tab 11 with a hole 12 therein for receiving a mounting screw 13. In this way jaw 3 is held fast to the first portion 10a of sensor beam 10. Jaw 3 also has a lip 14 which extends into a groove 15 of the sensor beam 10. Threaded hole 16 in sensor beam 10 threadably receives the mounting screw 13.

When assembled, jaw 3 is rigidly held with respect to the sensor beam 10 which serves as a mechanical input to the sensor assembly.

When vortices in space 100 pass the second portion 10b of beam 10, beam 10 is caused to pivot about its diaphragm 23. This pivotal movement is transferred to the jaw 3 which, in cooperation with jaw 2, squeezes and releases the optical fiber 5. This modulates light passing through the fiber. These modulations can be read and correspond to the passage of the vortices.

A hole 20 is provided in the flange portion 1a of mounting bracket 1 to provide access to the mounting screw 13 for disconnecting the mounting tab 11 from the beam 10. Another hole 17 in the mounting bracket 1 is sized larger than the microbend jaw 2 and receives the jaw 2. This hole, in conjunction with the spring 4, provides the necessary degree of freedom for self-alignment of the microbend jaws 2, 3 with respect to the 10a portion of the beam 10.

An adjustment screw 32 is threaded into the sensor housing 9 and adjusts the position of a calibration arm 34. Calibration arm 34 thus can be adjusted to bear down on jaw 2 and provide an initial adjustment for the sensor assembly.

If the sensor assembly 24 becomes defective, it can easily be replaced. First cover 31 is removed. After this the mounting screw 13 which accessed through hole 20 is unscrewed. This frees the jaw 3, and thus the hole sensor assembly 24, from beam 10. Lock nut 18 is then removed freeing the mounting bracket 1. The mounting bracket 1 is thus removed along with the connectors 6, the microbend jaws 2,3 and other parts connected to the bracket 1. A new sensor assembly can then be inserted into the housing 9. It is noted that this replacement operation does not disturb the pressure boundary 21 nor the sensor beam 10.

With a new sensor assembly in place calibration can be achieved through set screw 32.

Although an optical fiber sensor is used in the illustrated embodiment, other types of sensor elements can be used such as optical reflective type sensors, electromagnetic pick-up sensors, strain gage sensors and the like. For some sensor elements it might not even be necessary to establish connection or contact between the sensing element and the sensor beam 10.

While a specific embodiment of the invention has been shown and described in detail to illustrate the application of the principles of the invention, it will be understood that the invention may be embodied otherwise without departing from such principles.

What is claimed is:

1. A fiber optic sensor arrangement for easy removal from a vortex shedding flowmeter having a flowmeter housing which is exposed to a flowing fluid in a fluid space on one side of the flowmeter housing and the sensor on another side of the housing, comprising:
    a sensor housing defining a sensor space on the other side of said flowmeter housing;
    a sensor beam connected for movement to said sensor housing and having a first portion extending into said sensor space and a second portion extending through the flowmeter housing into the fluid space;
    pressure boundary means connected to said beam for isolating said sensor space from the fluid space;
    a mounting bracket detachably connected to said sensor housing; and
    a fiber optic sensor element operatively connected to said first portion of said sensor beam and connected to said mounting bracket said sensor element being disposed in said sensor space between a pair of jaws independently mounted on said sensor beam and said mounting bracket and being operatively engaged for sensing movement of said beam with passage of vortices past said second portion of said beam in the fluid space, said fiber optic sensor element being removable from said housing with one of said pair of jaws and said mounting bracket without disturbing the flowing fluid in the fluid space on the one side of the flowmeter housing, said pressure beam, or said pressure boundary means.

2. A sensor arrangement according to claim 1, wherein said pressure boundary means comprises a diaphragm connected to said beam between said first and second portions therof and fixed to said sensor housing.

3. A sensor arrangement according to claim 1, wherein said second jaw of said pair of jaws is engaged with said first jaw and an optical fiber is connected to said mounting bracket and extending between said jaws, said second jaw being detachably fixed to said first portion of said beam for movement therewith and for movement with respect to said second jaw.

4. A sensor arrangement according to claim 1, wherein said sensor housing has an opening near one end thereof opposite from the flowmeter housing, said mounting bracket having a flange portion detachably seated in said opening, said mounting bracket including a portion extending in said sensor space toward said first portion of said beam.

5. A sensor arrangement according to claim 4, wherein said first jaw of said pair of jaws is connected to said mounting bracket and said second jaw is engaged with said first jaw, an optical fiber connected to said mounting bracket and extending between said jaws, said second jaw being detachably fixed to said first portion of said beam for movement therewith and for movement with respect to said second jaw.

6. A sensor arrangement according to claim 5, including setting means fixed to said housing and engageable with one of said jaws for calibrating a new sensor element in said housing.

7. A sensor arrangement for a vortex shedding flowmeter having a flowmeter housing which is exposed to a flowing fluid in a fluid space on one side of the flowmeter housing, comprising:

a sensor housing defining a sensor space and having an opening near one end thereof opposite from the flowmeter housing;

a sensor beam connected for movement to said sensor housing and having a first portion extending into said sensor space and a second portion extending through the flowmeter housing into the fluid space;

pressure boundary means connected to said beam for isolating said sensor space from the fluid space;

a mounting bracket detachably connected to said sensor housing and having a flange portion detachably seated in said sensor opening, said mounting bracket including a portion extending in said sensor space toward said first portion of said beam;

a sensor element operatively connected to said first portion of said sensor beam and connected to said mounting bracket, said sensor element being disposed in said sensor space and being operatively engaged with said first portion of said beam for sensing movement of said beam with passage of vortices past said second portion of said beam in the fluid space, said sensor element being removable with said mounting bracket from said housing, said sensor element including a first jaw connected to said mounting bracket and a second jaw engaged with said first jaw, an optical fiber connected to said mounting bracket and extending between said jaws, said second jaw being detachably fixed to said first portion of said beam for movement therewith and for movement with respect to said second jaw;

setting means fixed to said housing and engageable with one of said jaws for calibrating a new sensor element in said housing, and a tab connected to said second jaw, a threaded bolt connecting said tab to said first portion of said beam, said flange portion of said mounting bracket including an access hole therethrough for accessing said bolt.

8. A sensor arrangement according to claim 7, including a lock nut threaded to said open end of said housing for detachably securing said flange portion to said housing, and an alignment pin extending in said flange portion and in said housing for establishing a selected rotational position of said mounting bracket in said housing.

9. A sensor arrangement according to claim 8, wherein said optical fiber comprises a loop extending between said jaws and having ends extending to said flange portion of said mounting bracket, and a pair of connectors connected to said flange portion of said mounting bracket, each engaged with one end of said optical fiber loop.

10. A sensor arrangement according to claim 9, wherein said pressure boundary means comprises a diaphragm connected to said beam between said first and second portions thereof and fixed to said sensor housing.

* * * * *